United States Patent [19]

Kaneda et al.

[11] Patent Number: 5,540,399

[45] Date of Patent: Jul. 30, 1996

[54] TAPE CASSETTE

[75] Inventors: Hiroshi Kaneda; Masatoshi Okamura, both of Saku, Japan

[73] Assignee: TDK Corporation, Tokyo, Japan

[21] Appl. No.: 177,317

[22] Filed: Jan. 4, 1994

[30] Foreign Application Priority Data

| Jan. 7, 1993 | [JP] | Japan | 5-002655 U |
| Jan. 21, 1993 | [JP] | Japan | 5-004405 U |
| Jan. 21, 1993 | [JP] | Japan | 5-004406 U |
| Jan. 21, 1993 | [JP] | Japan | 5-004407 U |

[51] Int. Cl.$^6$ .................................................. G11B 23/04
[52] U.S. Cl. .................................................................. 242/347
[58] Field of Search ............................... 242/347, 346.2, 242/346, 341; 360/132

[56] References Cited

U.S. PATENT DOCUMENTS

| 4,232,841 | 11/1980 | Hashimoto | 242/346 |
| 4,546,936 | 10/1985 | Okamura et al. | 242/347 |
| 4,665,456 | 5/1987 | Ahlberg et al. | 360/132 |
| 4,706,148 | 11/1987 | Komiyama et al. | 242/347 |

FOREIGN PATENT DOCUMENTS

| 52-37925 | 3/1977 | Japan . |
| 54-67927 | 5/1979 | Japan . |
| 63-122965 | 8/1988 | Japan . |
| 2-92888 | 7/1990 | Japan . |
| 4-57272 | 2/1992 | Japan . |

*Primary Examiner*—Daniel P. Stodola
*Assistant Examiner*—Emmanuel M. Marcelo
*Attorney, Agent, or Firm*—Oblon, Spivak, McClelland, Maier & Neustadt

[57] ABSTRACT

A tape cassette comprises a cassette casing composed of an upper casing and a lower casing; a pair of tape reels rotatably installed in the cassette casing and wound with a tape; a guide pin for controlling a running position of the tape; and a rotatable opening and closing lid for covering an opening portion of the cassette casing for drawing out the tape. A protrusion or protrusions are provided for restraining a height of the guide pin on a bottom face of a recess for inserting the guide pin provided on an inner face of the upper casing.

7 Claims, 13 Drawing Sheets

TAPE CASSETTE

This invention relates to a tape cassette such as a video tape cassette or an audio cassette which accommodates a record media, for instance, a tape-like media in a casing, particularly to thickness-reducing or weight-reducing of a tape cassette.

In a conventional video tape cassette, a magnetic tape is wound around tape reels which are accommodated in a tape reel accommodating area in a casing, an opening and closing lid is provided at a front face of the casing, and the opening and closing lid is opened when the tape cassette is loaded in a video device, thereby drawing the magnetic tape to the side of a head.

Figure 1A:
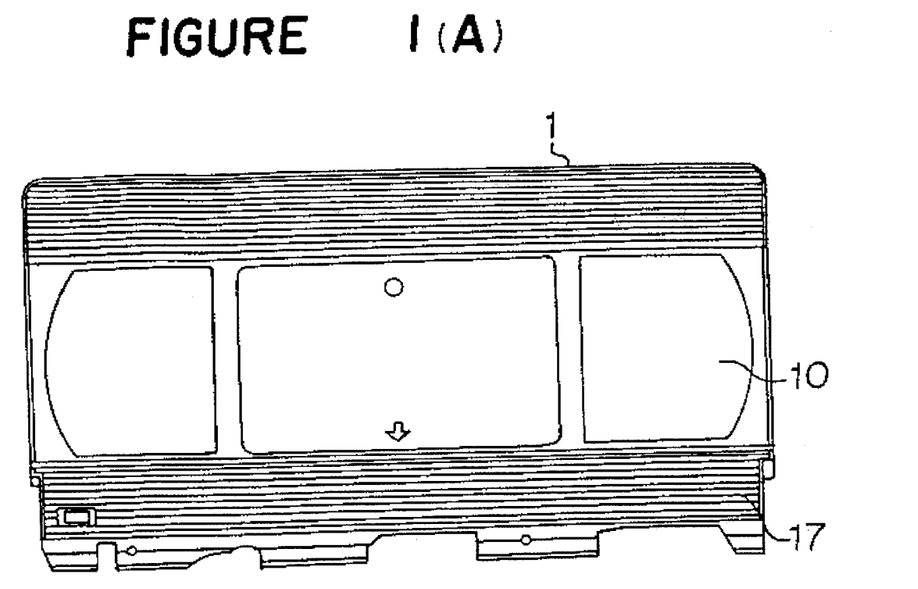
FIGS. 1(A) and 1(B) show an upper casing of a first example of this invention wherein FIG. 1(A) indicates a plane view from the outside, and FIG. 1(B) indicates a plane view from the inside.
Figure 1B:
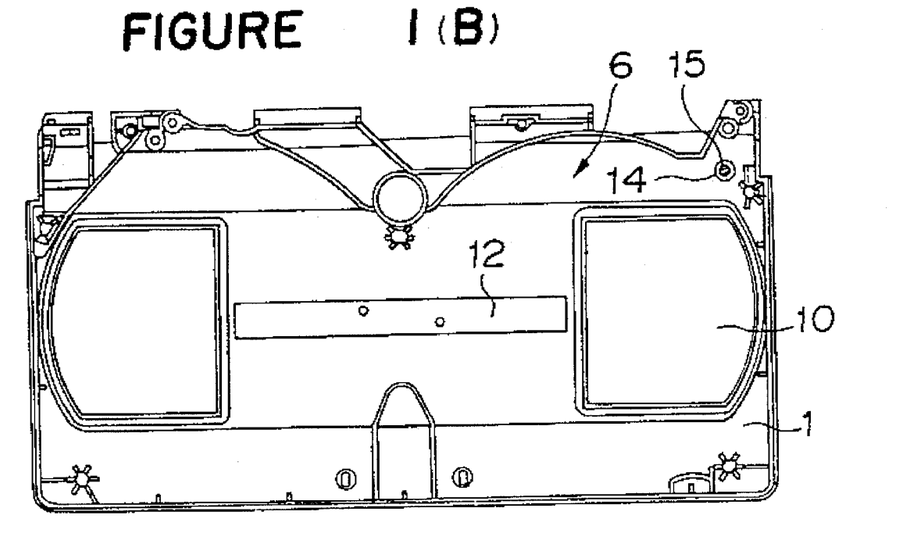
Figure 2:
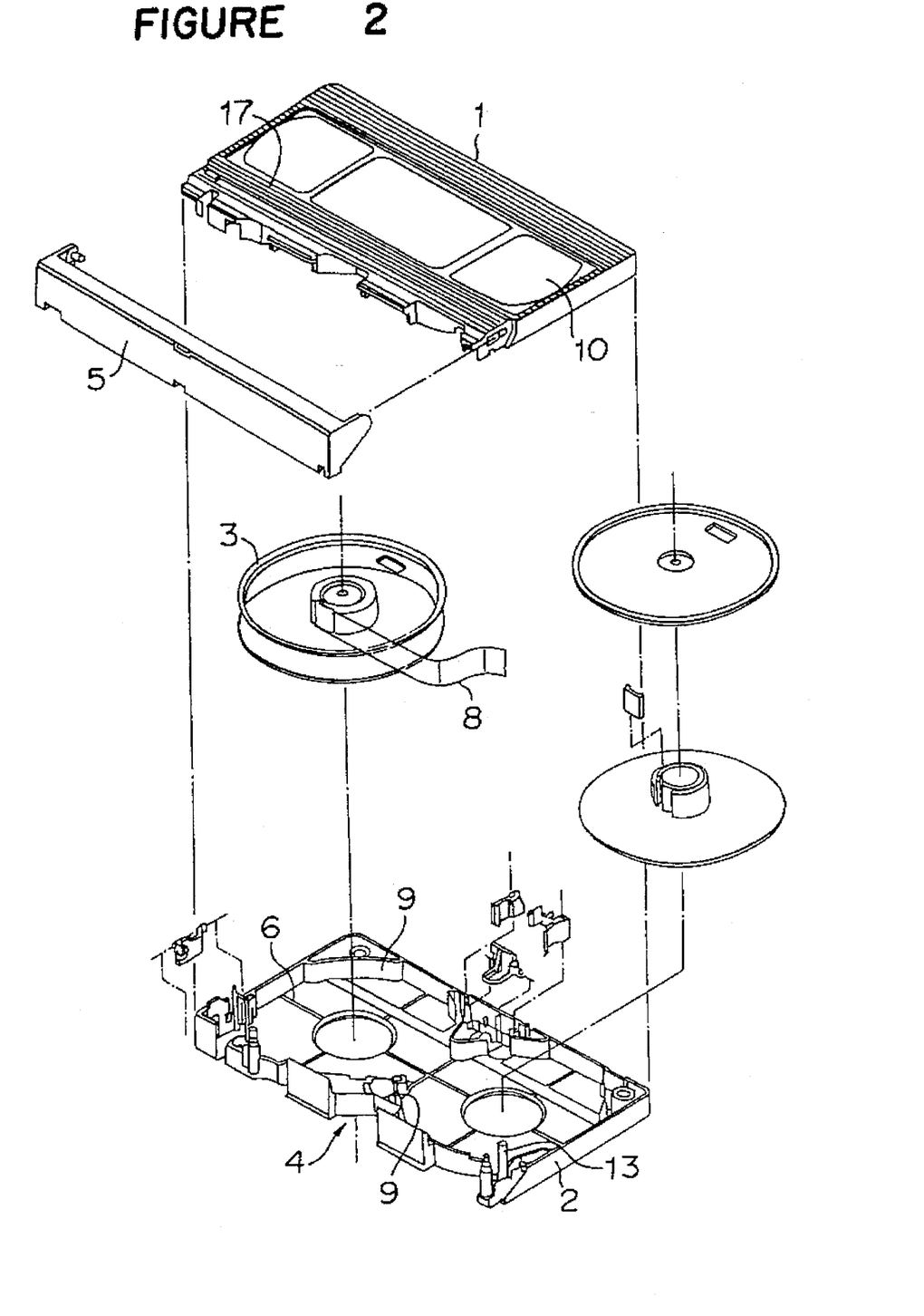
FIG. 2 is an exploded perspective of the example of FIG. 1 in its use state.
Figure 3:
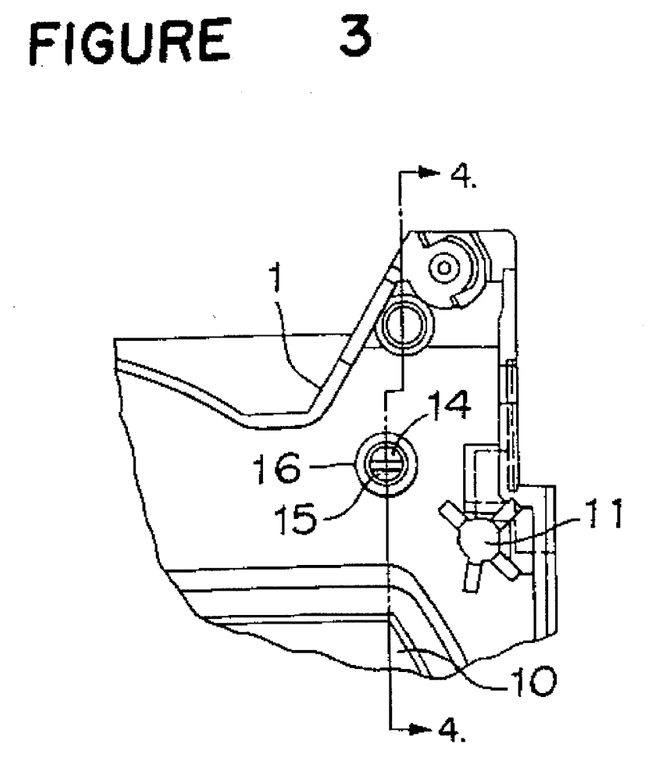
FIG. 3 is a partially enlarged plane view of FIG. 1.
Figure 4:
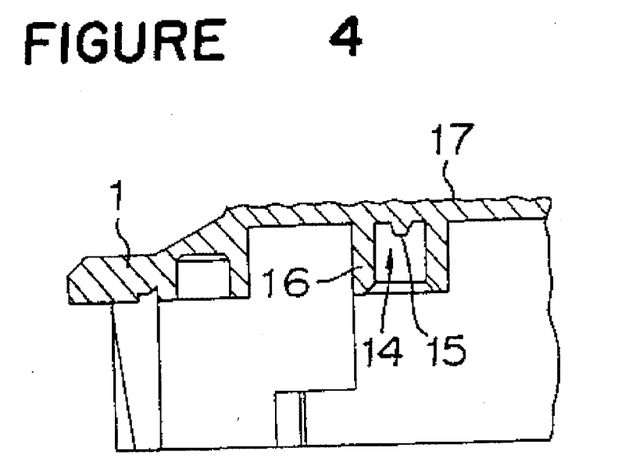
FIG. 4 is an enlarged longitudinal sectional diagram taken along the line C—C of FIG. 3.
Figure 5:
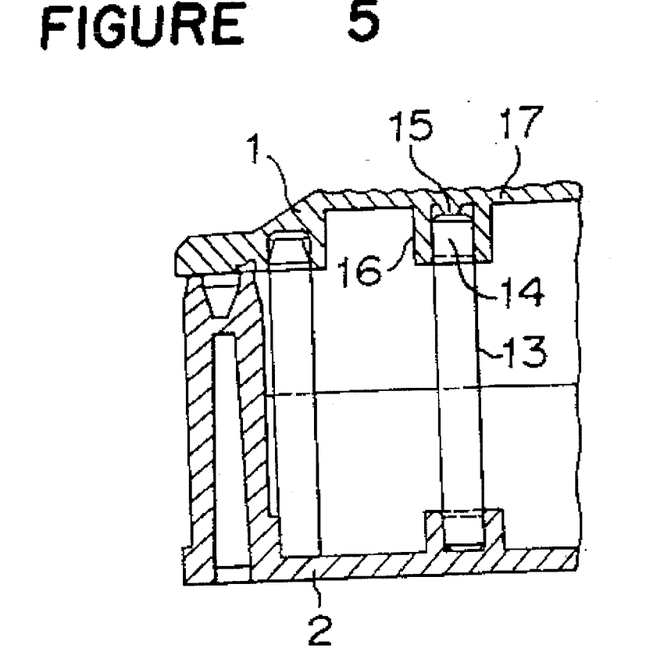
FIG. 5 is a longitudinal sectional diagram of the example of FIG. 4 in its use state.
Figure 6:
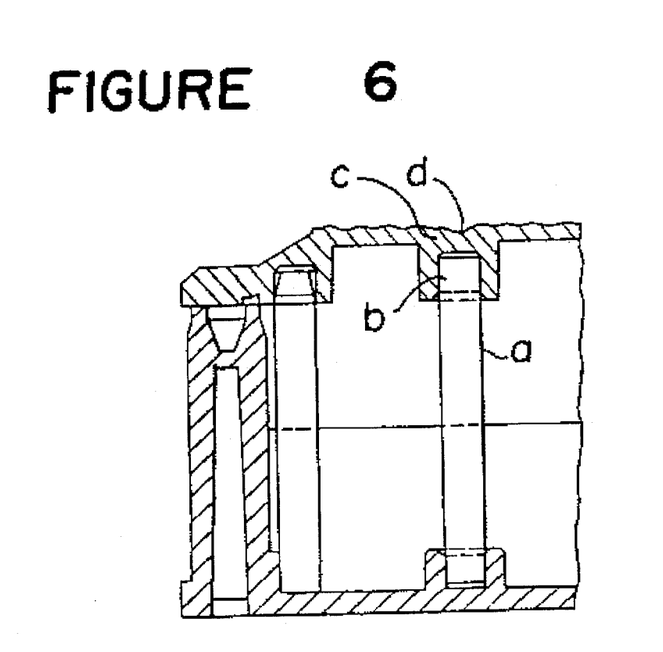
FIG. 6 is a longitudinal sectional diagram of a first conventional example corresponding to the example of FIG. 5.
Figure 7:
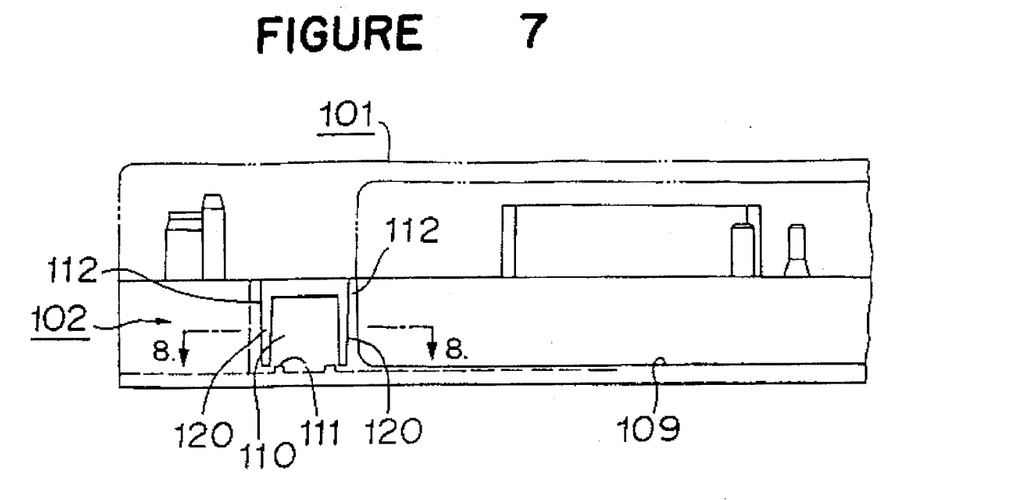
FIG. 7 is a partially enlarged front diagram showing a second example of this invention.
Figure 8:
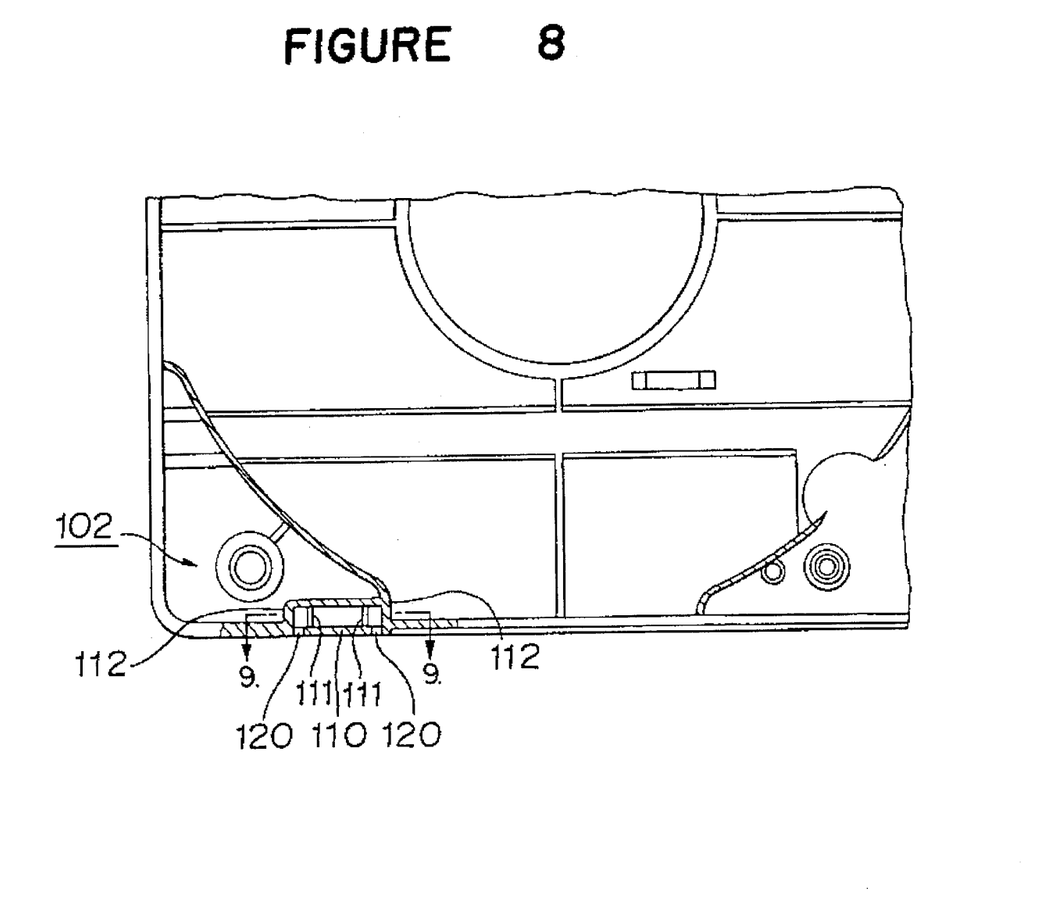
FIG. 8 is a partially cut plane view taken along the line A—A of FIG. 7.
Figures 9, 9A, 9B:
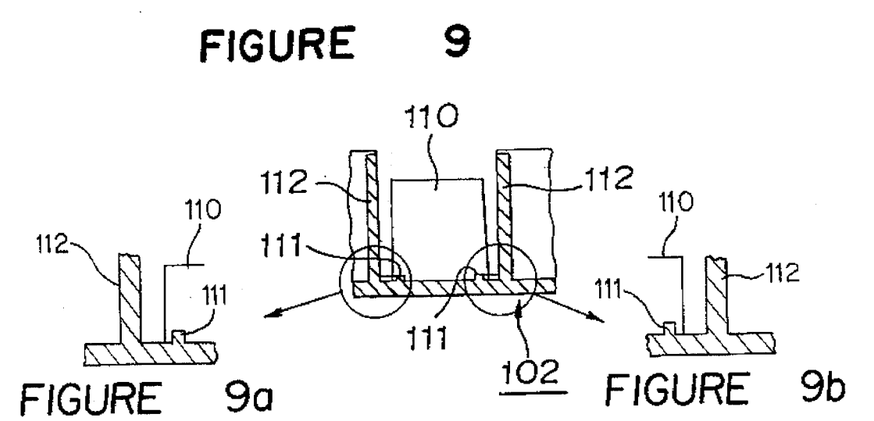
FIG. 9 is an enlarged longitudinal sectional diagram taken along the line B—B of FIG. 8.
Figure 10:
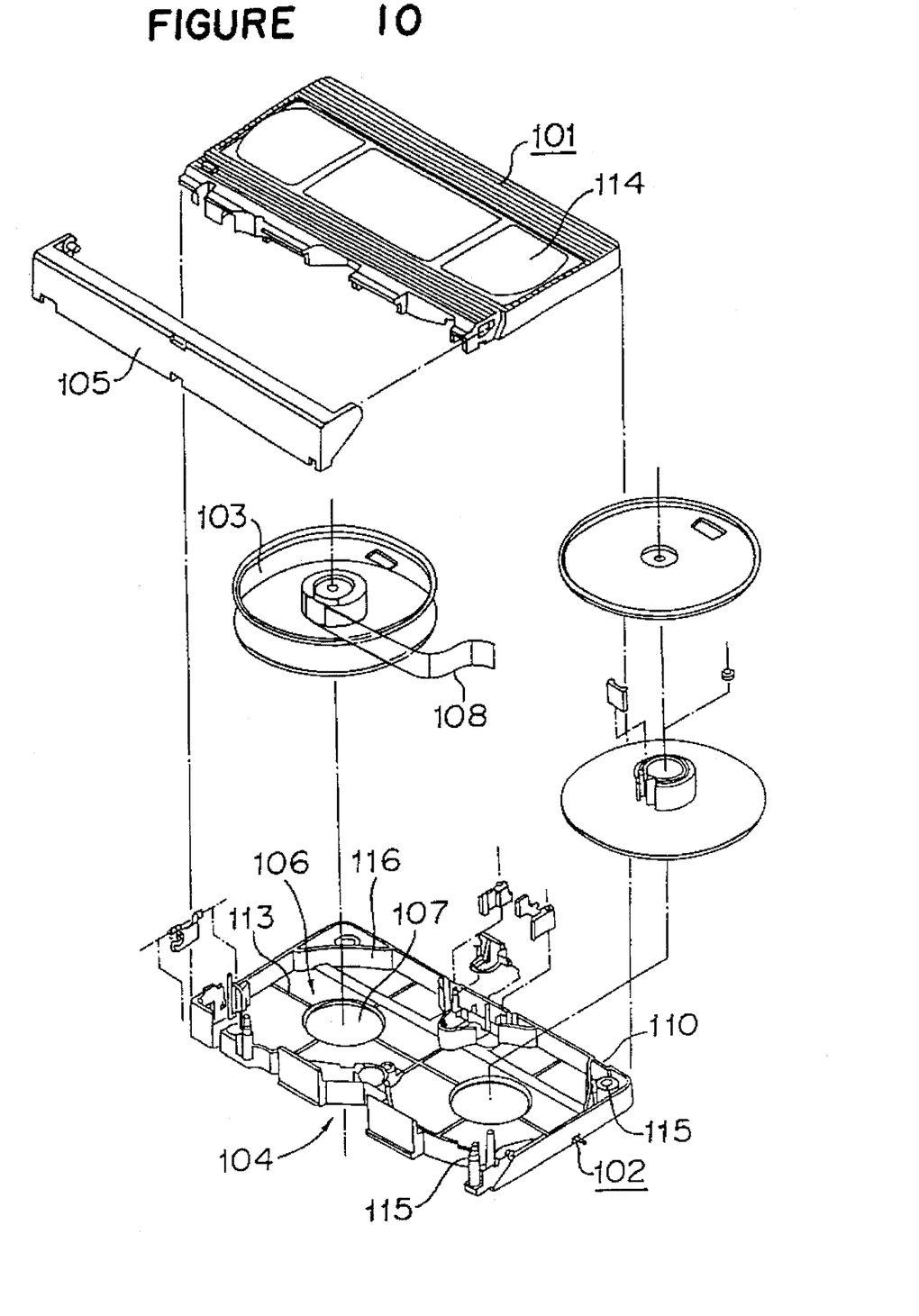
FIG. 10 is a perspective showing an exploded state of a product according to the second example of the present invention.
Figure 11:
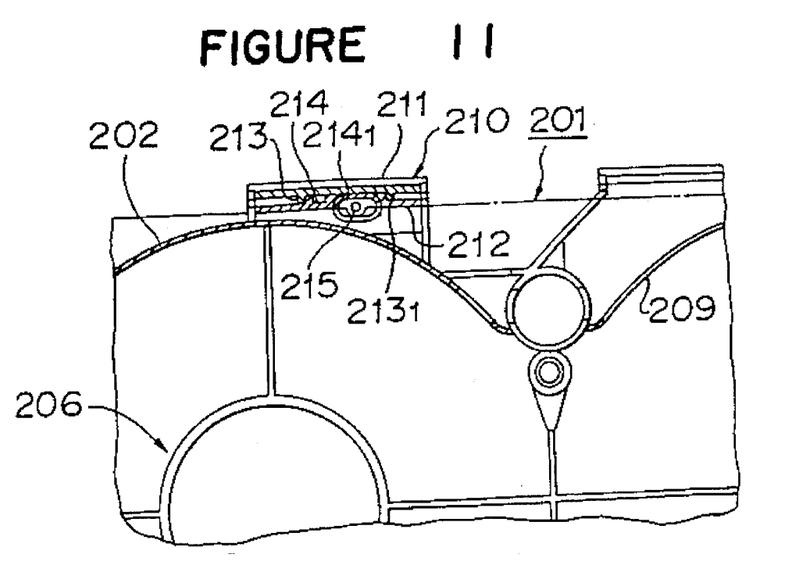
FIG. 11 is a partially cut plane view showing integrated upper and lower casings of a third example of the present invention.
Figure 12:
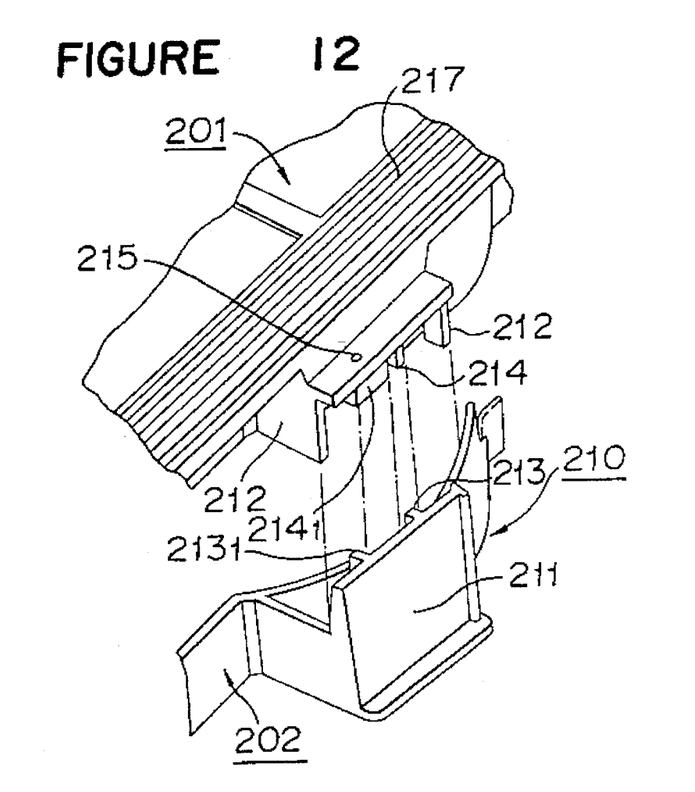
FIG. 12 is a perspective of the example in FIG. 11 in its separated state.
Figure 13:
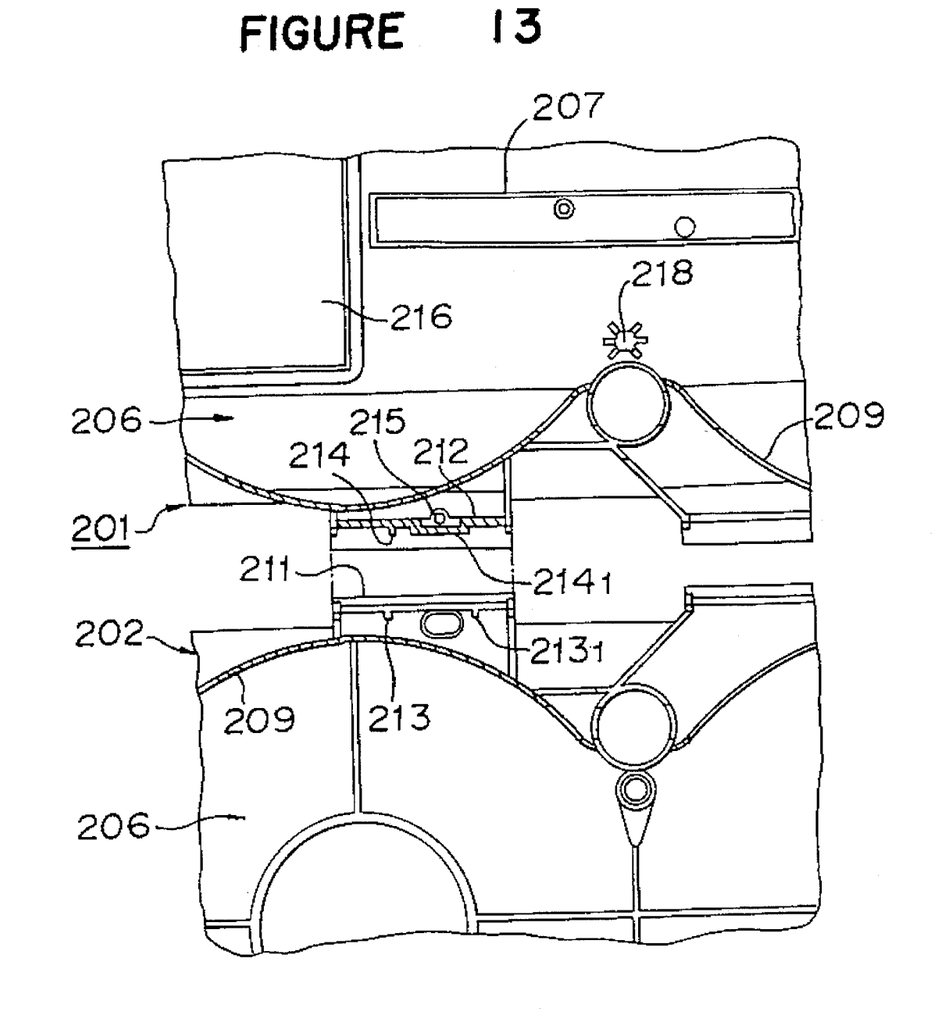
FIG. 13 is a separated plane view of upper and lower casings showing a developed state of the example of FIG. 12.
Figure 14:
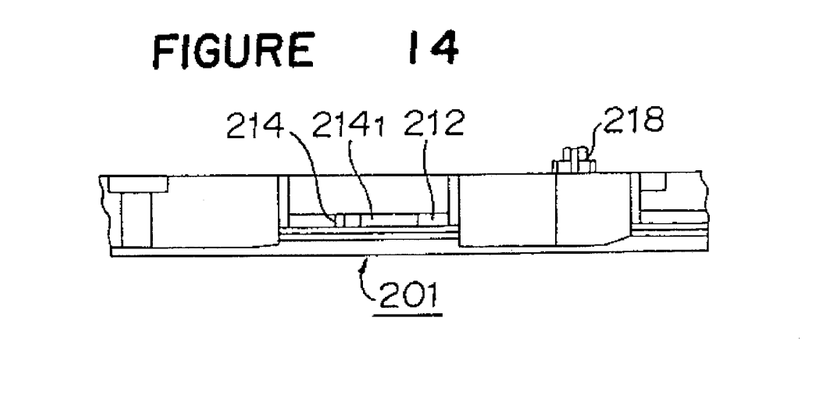
FIG. 14 is a front view of the upper casing of the example of FIG. 13.
Figure 15:
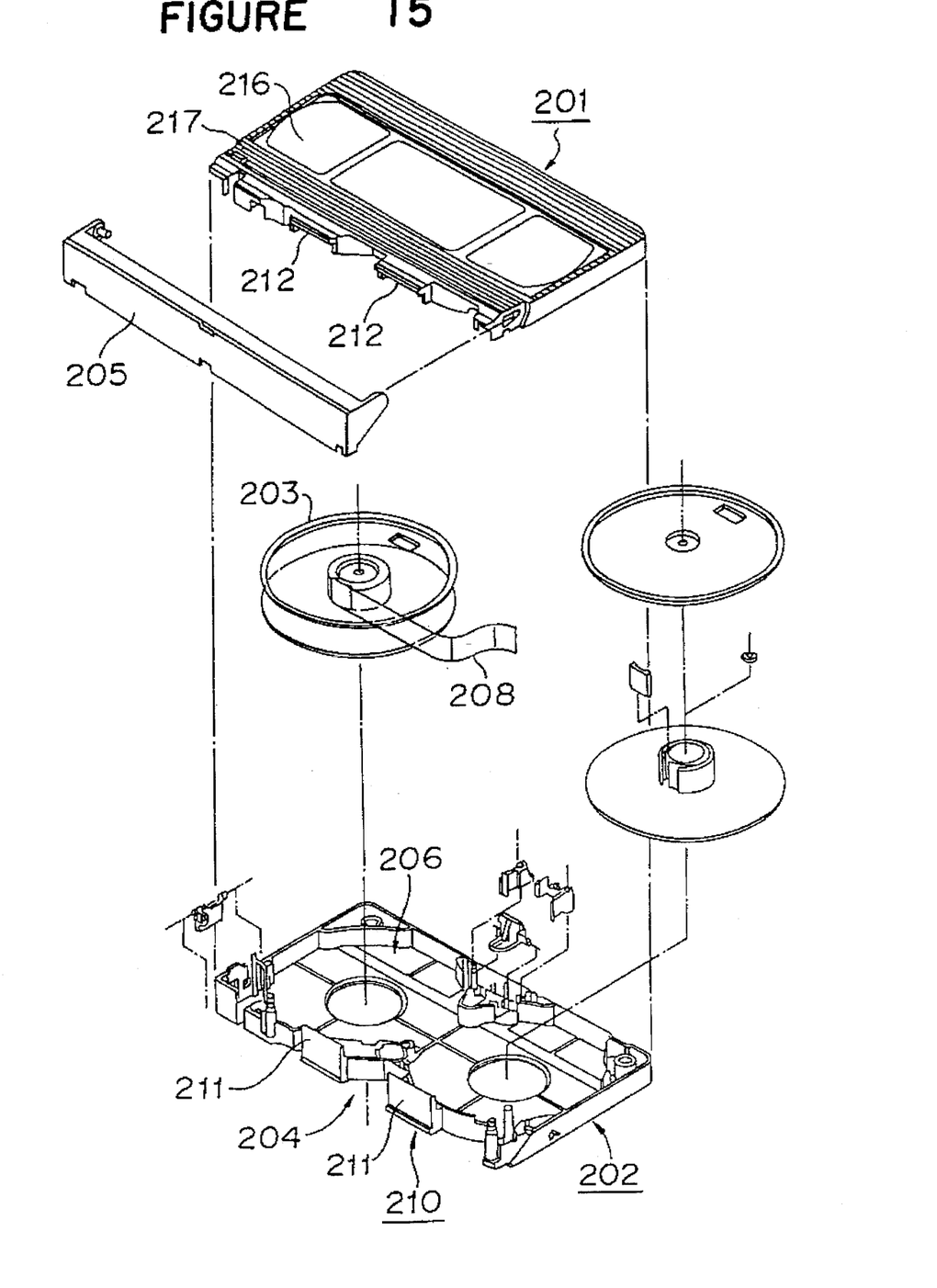
FIG. 15 is a separated perspective view of a product of the example in FIG. 11 in its use state.

In a video tape cassette of a first conventional example, as shown in FIG. 6, an upper casing is formed with a comparatively thick casing thickness in view of its strength. When the casing thickness is reduced, for increasing the forming cycle of the casing, for reducing its weight and for reducing the production cost, the thickness of a portion "c" of a face corresponding to a recess "b" for inserting a guide pin "a" which is provided in the casing for controlling the running of a tape, cannot be reduced owing to the guide pin "a". A recess-in-molding "d" is caused by the shrinkage of resin, which deteriorates the appearance quality of the surface of the casing, and the productivity cannot be increased since the forming conditions become severe to avoid the recess-in-molding.

It is an object of the present invention to avoid these conventional drawbacks and to provide a tape cassette wherein no recess-in-molding is caused on the corresponding face of the recess for inserting the guide pin for controlling the running of a tape even when the casing is thinned for weight-reducing and cost-reducing of the casing, the production can be performed without deteriorating the appearance quality, and the increase in the forming cycle of the casing can reasonably be performed, thereby contributing to the cost performance.

In a tape cassette of a second conventional example, a claw for preventing erroneous erasure is provided at a detecting unit on an outer wall face of a casing so that the information of a record media is not erroneously erased, which is provided with a function capable of precisely performing the prevention of the erroneous recording by the presence or absence of the claw for preventing erroneous erasure.

However, the claw for preventing erroneous erasure is provided integrally with the casing in a tongue form with a thickness the same as the thickness of the casing. The thickness, width and an elastic bending or warp toward the inside of the casing is prescribed in a JIS standard. For instance, it is prescribed with respect to the warp of the claw that the warp is not larger than 0.2 mm against an outer pressure of 100 g. When the root of the claw is thinned, the warp of the claw for preventing erroneous erasure cannot be maintained to not larger than 0.2 mm, and a failure in the warp of the claw or a failure in pressure on the claw is caused which gives rise to the trouble in erroneous operation which is quite problematic. As a countermeasure, it is considered to adjust the thickness or the height of the claw. However, the dimension of the claw or the pressure on the claw become out of the standard.

It is an object of the present invention to avoid these conventional drawbacks and to provide a tape cassette having high reliability without the failure in the warp of the claw for preventing erroneous erasure or the failure in the pressure on the claw, thereby contributing to an increase in the forming cycle and the cost performance.

Figure 16:
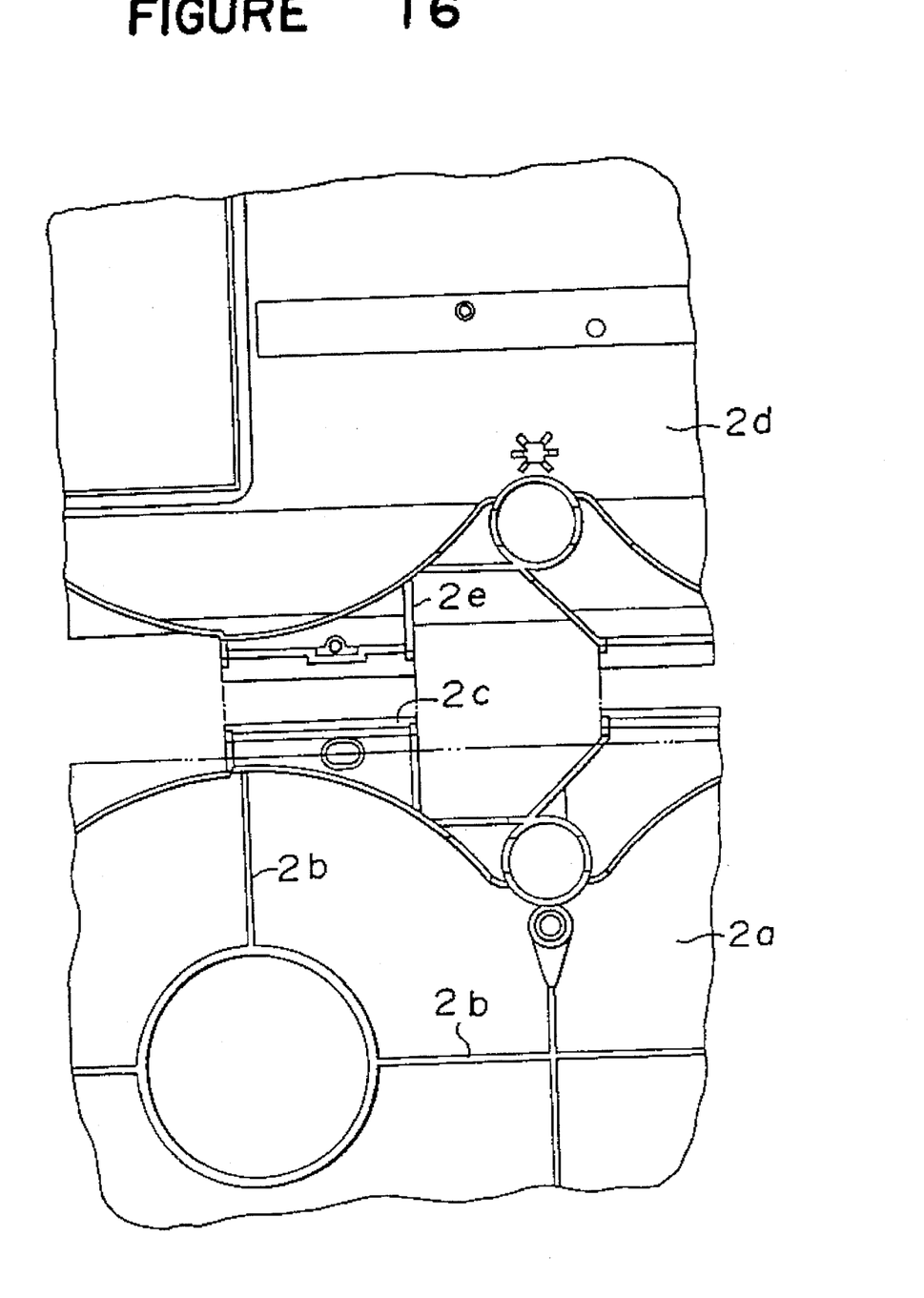
FIG. 16 is a plane view showing a separated state of upper and lower casing of a tape cassette of a third conventional example.
Figure 17:
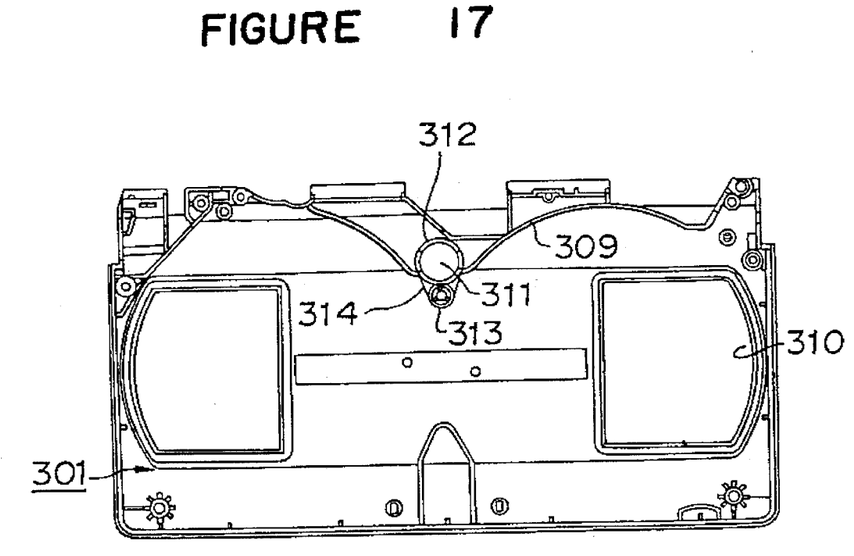
FIG. 17 is a plane view of an upper casing of a fourth example of this invention.
Figure 18:
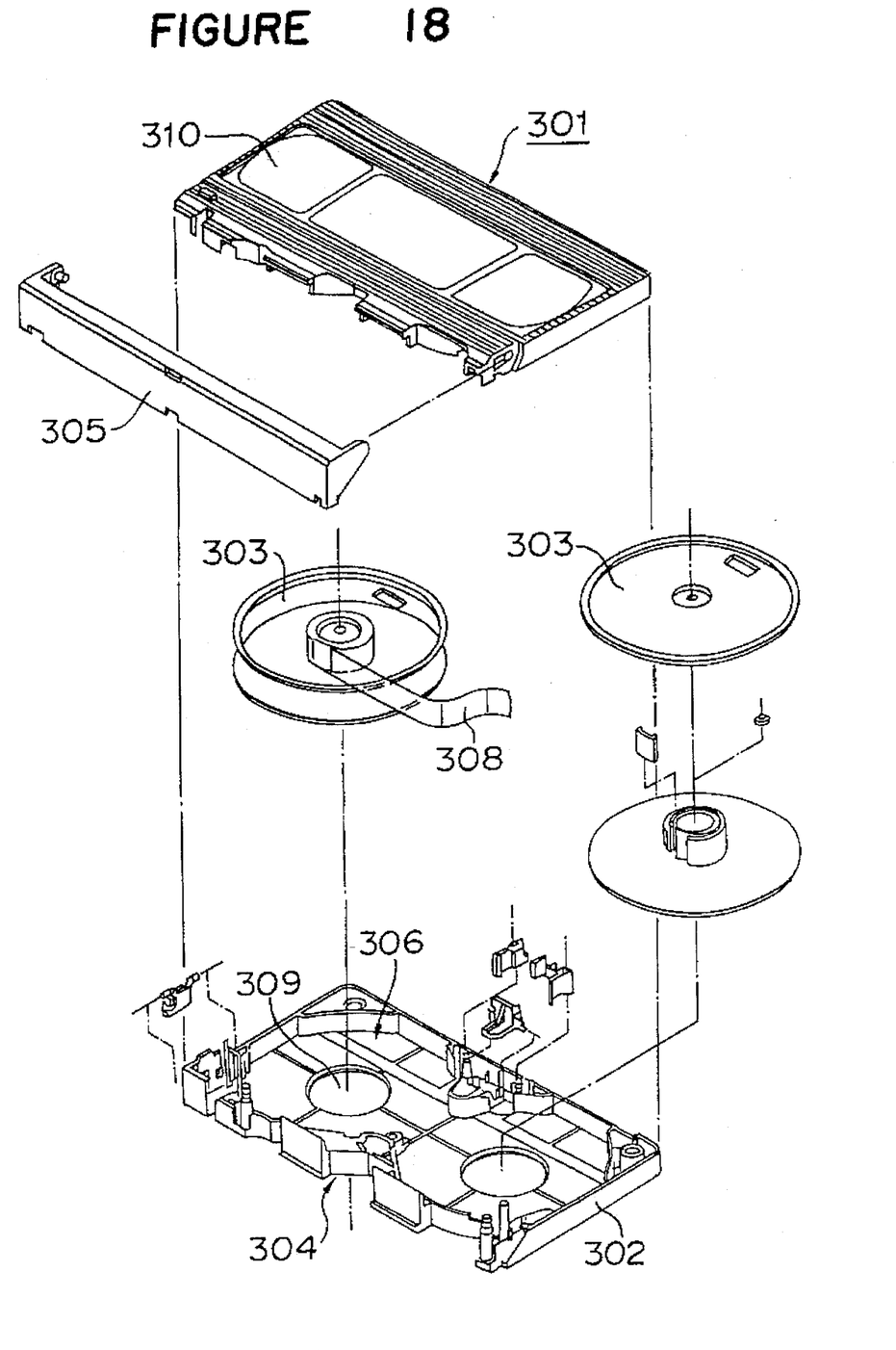
FIG. 18 is a perspective of a product in use of the example of FIG. 17 in its separated state.
Figure 19:
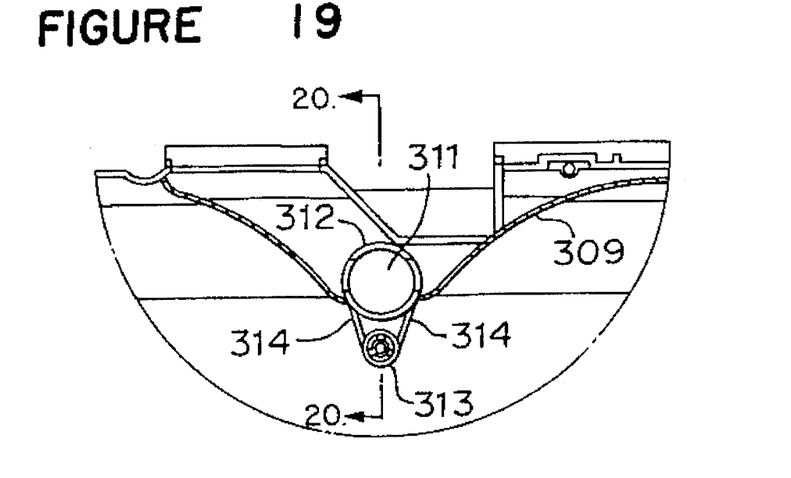
FIG. 19 is a partially enlarged plane view of the example of FIG. 17.
Figure 20:
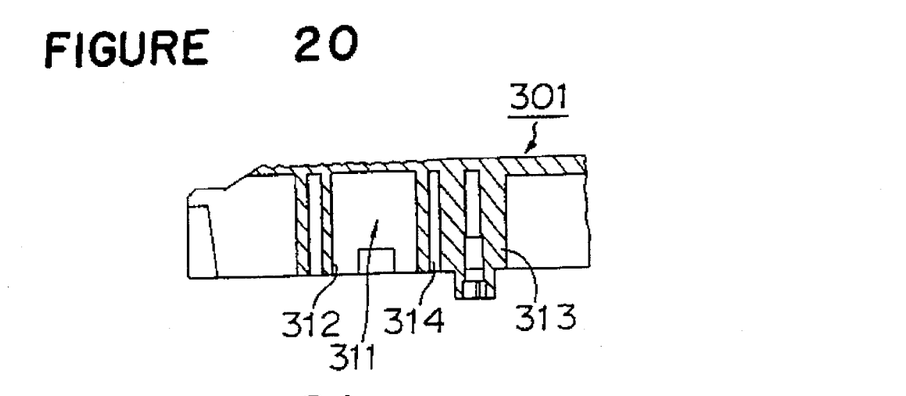
FIG. 20 is an enlarged longitudinal sectional diagram taken along the line A—A of FIG. 19.

In a video cassette of a third conventional example, when the casing thickness is increased for increasing the strength of a casing to prevent the deformation of the casing, the failure in appearance such as the recess-in-molding is apt to be caused. Accordingly, in FIG. 16, the casing thickness is decreased, and the increase in strength is achieved by reinforcing the video cassette by installing lattice-like ribs 2b at all over the inner face which are extended from side walls of the casing. A guide wall for running a tape which is provided at a front face of the casing, is composed of a guide face portion 2c which is extended from a lower casing 2a by the width of a tape, and a support portion 2e which is vertically extended at the rear side of the guide face portion 2c. The guide face portion 2c and the support portion 2e are constructed to butt each other in integrating the cassette. Therefore, a warp deformation is apt to cause in the tape cassette after long hours of use, or a deformation is apt to cause when a stress from either one of the upward and downward directions is applied on the tape cassette, which gives rise to the lowering of the rigidity against an environmental change, or hampers the running of a tape by causing a shift in the longitudinal direction of the cassette. It is proposed to prevent the shift in Japanese Unexamined Utility Model Publication No. 122965/1988 wherein ribs are extended from the matching position of the casing. However, the tape cassette in the conventional engineering is apt to suffer destruction by a poor matching or a dropping impact, which is problematic in durability and reliability.

It is an object of the present invention to avoid the drawbacks of this conventional example and to provide a highly reliable and inexpensive tape cassette which prevents the shift in the longitudinal direction of the cassette even after long hours of use of the tape cassette, even when there is an environmental change, or even when a stress is applied on the cassette due to a warp deformation or from either one of the upward and downward directions, and which can safely be maintained and employed, without the failure in matching, and which is strong against an impact force, having the durability and no disadvantage in running the tape, and wherein the increase in the strength of the casing can reasonably be performed.

In a video tape cassette of a fourth conventional example, a magnetic tape is wound around tape reels which are accommodated in a tape reel accommodated area in the casing, an opening and closing lid is provided at a front face of the casing, and the opening and closing lid is opened when the tape cassette is loaded in a video device, thereby drawing the magnetic tape to the side of a head.

Figure 21:
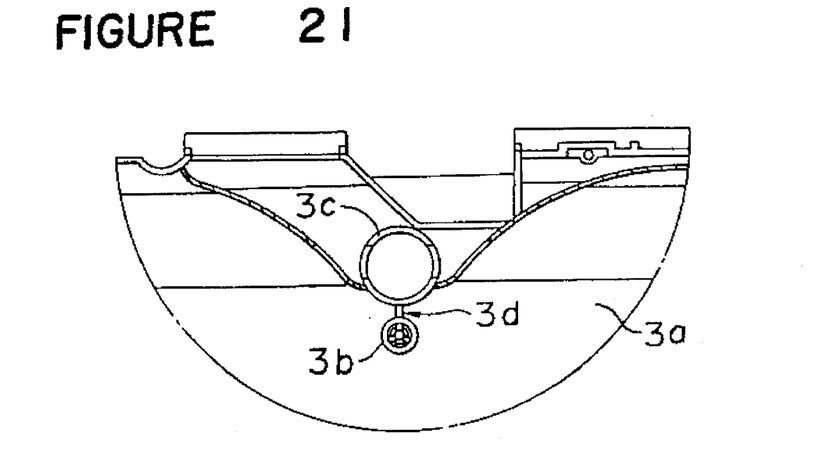
FIG. 21 is a partially enlarged plane view showing an inner face of an upper casing proximate to a light source hole in a fourth conventional example.

As shown in FIG. 21, in this tape cassette, the upper and lower casings are integrated by a bonding boss. A bonding boss 3b of an upper casing 3a which is proximate to a light source cylinder 3c, is often separated from the light source cylinder, or is protrudingly provided such that the bonding boss 3b is connected to the light source cylinder 3c by a single piece of a reinforcing rib 3d.

However, in the video cassette of a third conventional example, a deformation by a pressing member for tape reels is apt to cause on the upper casing. When the casing thickness is increased to increase the strength of the casing, the appearance quality is lowered due to the recess-in-molding or the like. Accordingly, the casing thickness is decreased to resolve the drawback. Even if the bonding boss which is proximate to the light source hole is reinforced by connecting it to the light source cylinder by a single piece of rib, the structure is weak against the stress in the longitudinal direction of the cassette or an outer force in a torsional direction, which is apt to cause a shift by a dropping impact, and is apt to cause cracks or a phenomenon of white turbidity at the root of the boss, thereby lowering the commercial value due to a poor appearance and causing a problem in view of its reliability.

It is an object of the present invention to avoid the drawbacks of these conventional examples, and to provide a highly reliable and inexpensive tape cassette wherein there is no recess in molding in the appearance of the casing and the increase in the strength of the casing can reasonably be achieved.

SUMMARY OF THE INVENTION

According to a first aspect of the present invention, there is provided a tape cassette comprising:

a cassette casing composed of an upper casing and a lower casing;

a pair of tape reels rotatably installed in the cassette casing and wound with a tape;

a guide pin for controlling a running position of the tape, and a rotatable opening and closing lid for covering an opening portion of the cassette casing for drawing out the tape;

wherein a protrusion or protrusions are provided for restraining a height of the guide pin on a bottom face of a recess for inserting the guide pin provided on an inner face of the upper casing.

According to a second aspect of the present invention, there is provided a tape cassette comprising:

a casing composed of an upper casing and a lower casing and accommodated with a wound tape;

a claw for preventing erroneous erasure; and a rib or ribs for restraining a warp toward an inside of the casing protrudingly provided at a root of the claw for preventing erroneous erasure.

According to a third aspect of the present invention, there is provided a tape cassette comprising:

a cassette casing composed of an upper casing and a lower casing;

a pair of tape reels rotatably provided in the cassette casing and wound with a tape;

an opening and closing lid for covering an opening portion of the cassette casing for drawing out the tape;

a guide face portion extended from the lower casing by a width of the tape; and a support portion extended vertically from the upper casing at a rear side of the guide face portion;

wherein a tape running guide wall provided at a front face portion of the cassette casing comprises the guide face portion extended from the lower casing by a width of the tape and the support portion extended vertically from the upper casing at the rear side of the guide face portion and vertical first ribs are protruded from a first one of opposing faces of the guide face portion and the support portion whereas second ribs for fitting with the first ribs are protruded from a second one thereof.

According to a fourth aspect of the present invention, there is provided a tape cassette comprising:

a casing composed of an upper casing and a lower casing integrated by a bonding boss;

a pair of tape reels rotatably installed in the casing and wound with a tape; and a rotatable opening and closing lid for covering an opening portion of the casing for drawing out the tape;

wherein the bonding boss installed proximate to a light source cylinder forming a light source hole of the upper casing is connected to the light source cylinder by a plurality of reinforcing ribs.

According to the first aspect of the present invention, the guide pin for controlling a running position of the tape is inserted at a position wherein the tape that is wound around the tape reels runs in the casing. Since there is a protrusion or protrusions at the bottom portion in the recess for inserting the guide pin, the height of the guide pin can be restrained even when the thickness of the bottom of the recess portion is reduced. Further, the tape cassette can be produced without generating the recess-in-molding at the face corresponding of the recess for inserting the guide pin. Both the increase in the forming cycle and the decrease in the weight of the cassette casing can be performed, which contributes to the cost performance, thereby producing a tape cassette having a good appearance without the recess-in-molding on the casing.

According to the second aspect of the present invention, the ribs for restraining the warp of the claw for preventing erroneous erasure provided in the casing, toward the inside of the casing, are installed at the root of the claw for preventing erroneous erasure. Accordingly, even in thinning the casing, the claw for preventing erroneous erasure can precisely be maintained by the presence of the ribs with no excessive bending, thereby providing a highly reliable tape cassette without the failure in the warp of the claw or the failure in the pressure on the claw, whereby the increasing in the forming cycle in the forming operation is enabled, the quality control is easy and the invention can contribute to the cost performance.

According to the third aspect of the present invention, in preserving the content of the tape cassette, the opening and closing lid in the casing is closed and locked, and the tape in the casing is protected in a safe state. When the casing is loaded in a deck in use thereof, a lock release operating unit on the deck side opens the opening and closing lid, and the tape is exposed and runs on the guide wall for running the tape. The guide wall for running the tape which is provided at the front face portion of the casing is composed of the guide face portion which is extended from the lower casing by a width of the tape, and the support portion which is vertically extended from the upper casing to the rear side of the guide face portion. The vertical first ribs are provided on one of opposing faces of the both portions and the second ribs which fits to the first ribs are provided on the other one thereof. Accordingly, the tape cassette is reinforced against the stress with respect to a torsional direction, there is no shift in the matching position of the cassette, the tape cassette precisely maintains the guide wall for running the tape, and therefore, the tape cassette can be employed for a long time.

According to the fourth aspect of the present invention, in preserving the content of the cassette tape, the opening and closing lid provided in the casing is closed and locked, thereby protecting the tape in the casing in a safe state. In using the tape cassette, when the case is loaded in a deck, a lock release operating unit on the deck side opens the opening and closing lid, and the tape is exposed and can be used. Since the reinforcing ribs are connected to the bonding boss which is proximate to the light source cylinder, the invented cassette tape is strong against the stress in the longitudinal direction or an outer force in a torsional direction, no shift is caused by dropping it, and the casing can be strengthened by the reinforcing ribs which are designed as less as possible, thereby producing a tape cassette having a good appearance wherein the reinforced portion is simplified and there is no recess in molding in the appearance of the casing.

DESCRIPTION OF THE PREFERRED EMBODIMENTS

EXAMPLE 1

An example will be given to a first embodiment of this invention in reference to FIGS. 1(A), 1(B) and 2 through 5. A pair of tape reels 3 around which a magnetic tape 8 is wound, are rotatably provided in a cassette casing composed of an upper casing 1 and a lower casing 2. The magnetic tape cassette is provided with a pin 13 for controlling the running of a tape at a position at which the magnetic tape runs, and a rotatable opening and closing lid 5 for covering an opening portion 4 for drawing out the tape. A pressing member 12 is provided at the upper casing 1 for pressing the tape reels 3. A protrusion 15 for restraining the height of the guide pin 13 is provided on the bottom face of a recess 14 which is provided on the inner face of the upper casing for inserting the guide pin 13 at a position for running the tape, which is outside an accommodating area 6 for the tape reels 3.

In this case, the protrusion 15 for controlling the height is a linear rib or a rib having a shape of a truncated cone which is parallel or vertical to the longitudinal direction of the casing, and which is installed at the bottom portion of the recess 14 for inserting the guide pin 13 that is formed by a ring-like rib 16. It is preferable that the top face of the protrusion 15 is flat and the protrusion is formed by tapered walls. In anyway, the height of the guide pin 13 can be restrained.

In these Figures, reference numeral 8 designates a tape, 9, a partition wall, 10, a window member, 11, a melt-bonding portion or a bonding boss, and 17, a rugged stripe pattern formed on the surface of the casing.

EXAMPLE 2

An explanation will be given of a second embodiment of this invention by an example of a video tape cassette in reference to FIGS. 7 through 10. A pair of tape reels 103 around which a magnetic tape 108 is wound, is rotatably provided in a casing composed of an upper casing 101 and a lower casing 102. The magnetic tape cassette is provided with a rotatable opening and closing lid 105 for covering an opening portion 104 for drawing out the magnetic tape 108. Ribs 111 for restraining a warp of a claw 110 for allowing an erasure toward the inside of the casing, are provided at the root of the claw 110 in the cassette tape wherein the claw 110 is installed on the lower casing 102 that is provided with gaps 120 on its both sides.

In this case, the ribs 111 are preferably extended in parallel with the direction of the warp of the claw 110 for preventing erroneous erasure. It is preferable that a pair of the ribs are opposingly installed on the inner bottom face of the lower casing 102 at the both sides of the root of the claw 110 for preventing erroneous erasure, and that the ribs are protrudingly installed on the rear side of the claw 110 for preventing erroneous erasure along partition walls 112.

Further, it is preferable that with respect to the casing, the thickness of a tape reel accommodating area opposing the tape reels 103 is reduced, a clearance between a reinforcing rib 113 and the tape reels 103 is increased such that there is no disadvantage such as generation of abrasive powders by contact.

In these Figures, reference numeral 107 designates a hole for a driving shaft, 109, a label area, 114, a window member, 115, a bonding boss, and 116, a partition wall.

EXAMPLE 3

An explanation will be given of a third embodiment of this invention by an example in reference to FIGS. 11 through 15. A pair of tape reels 203 around which a magnetic tape 208 is wound, are rotatably installed in a casing composed of an upper casing 201 and a lower casing 202. The magnetic tape cassette is provided with a rotatable opening and closing lid 205 for covering an opening portion 204 for drawing out the magnetic tape. The tape cassette is provided with a pressing member 207 for the pair of tape reels 203 on the upper casing 201. The tape cassette is provided with a tape running guide wall 210 which is installed on a front face portion of the casing, and which is composed of a guide face portion 211 that is extended from the lower casing 202 by a width of tape, and a support portion 212 which is vertically extended from the upper casing 201 on the rear side of the guide face portion 211. A partition wall $214_1$ surrounding a detection hole 215 formed on the upper casing 201 and a rib 214 protrudingly installed apart from the partition wall $214_1$, are provided on the upper casing 201 in parallel with the support portion 212. A pair of ribs 213 and $213_1$ which respectively fit to the partition $214_1$ and the rib 214, are oppositely installed on the guide face portion 211 of the lower casing 202.

These ribs 213, $213_1$, 214 and $214_1$ are linear ribs in parallel with each other in the vertical direction of the casing with spacings from each other, which are protruded toward the inside of the casing and fitted and engaged with each other at alternately arranged positions. The ribs 213 and $213_1$ on the lower casing are long, and the ribs 214 and $214_1$ are arranged on the upper casing as reinforcing ribs the lengths of which are comparatively short. With respect to a shift in the longitudinal direction of the cassette, that is, in both left and right directions, it is preferable that the arrangement contributes to the prevention of the shift in the longitudinal direction of the cassette, by mutually engaging either one of a combination of the ribs 213 and 214, and a combination of the rib $213_1$ and the partition wall $214_1$. Further, in case wherein the partition wall $214_1$ is not utilized, it is preferable to provide plural pairs of ribs to avoid with the shift.

Further, with respect to the casing 201, it is preferable that the thickness of the upper casing is gradually decreased toward the outer peripheral direction of the tape reel accommodating area 206 opposing the tape reels 203, whereby there is no disadvantage such as generating abrasive powders by contact, by increasing the clearance between the tape reels 203 and the casing 201.

In these drawings, reference numeral 208 designates a tape, 209, a partition wall, 216, a window member, 218, a melt bonding portion or a bonding boss, and 217, a rugged stripe pattern.

EXAMPLE 4

An explanation will be given to a fourth embodiment of this invention by an example in reference to FIGS. 17 through 20. A pair of tape reels 303 around which a magnetic tape 308 is wound, are rotatably provided in a tape reel accommodating area 306 in a casing composed of an upper casing 301 and a lower casing 302. The tape cassette is provided with a rotatable opening and closing lid 305 for covering an opening portion 304 for drawing the magnetic tape. A bonding boss 313 provided proximate to a light source cylinder 312 forming a light source hole 311 of the upper casing 301 and the light source cylinder 312 are connected through a plurality of reinforcing ribs 314.

In this case, a pair of the reinforcing ribs 314 connect the bonding boss 313 having a cylindrical shape and the light source cylinder 312 in tangential directions of the both cylinders, and the linear ribs are provided at an interval, in connection with an outer peripheral portion of a partition wall 309 such that the linear ribs are not protruded to the tape reel accommodating area. The reinforcing rib 314 may be arranged at the central portion, if necessary.

Further, with respect to the casing 301, it is preferable that the thickness of the upper casing is reduced at the tape reel accommodating area 306 opposing the tape reels 303, and that there is no disadvantage such as generation of abrasive powders by contact, by increasing the clearance between the upper casing and the tape reels 303.

In these Figures, reference numeral 308 designates a tape, 309, a partition wall and 310, a window member.

As stated above, according to the first aspect of the present invention, the recess for restraining the height of the guide pin is provided at the bottom face of the recess for inserting the guide pin which is installed at the inner face of the upper casing in the tape cassette wherein the guide pin for controlling the running of the tape is inserted. Accordingly, even when the thickness of the casing is formed to be thin, there is no generation of the recess-in-molding on the corresponding face of the recess for inserting the guide pin, the production can be performed without impairing the appearance quality, it is possible to increase the forming cycle of the casing and also to reduce its weight, the invention can contribute to the cost performance, and a tape cassette having a good appearance of the casing and high commercial value can be produced.

According to the second aspect of the present invention, in a tape cassette wherein a wound tape is accommodated in the casing composed of the upper casing and the lower casing, and which is provided with the claw for preventing erroneous erasure in the casing, the ribs for restraining the warp of the claw for preventing erroneous erasure toward the inside of the casing, are protruded on the root portion of the claw for preventing erroneous erasure. Accordingly, the tape cassette is provided with high reliability without failure of the warp of the claw for preventing erroneous erasure or the failure in pressing the claw, wherein the standard of the thickness or the height of the claw for preventing erroneous erasure is not violated. Further, the invention contributes to the promotion of the forming cycle and the cost performance, the strength of the casing can be increased by the reinforcing ribs which are made as small as possible, the reinforcing portion is simplified, there is no recess in molding in the appearance, the reinforcing ribs are not seen in the appearance, and a tape cassette having a good outlook can be provided.

According to the third aspect of the present invention, the tape cassette is provided with a pair of tape reels around which a tape is wound, which are rotatably provided in the cassette casing which comprises the upper casing and the lower casing, the opening and closing lid covering an opening portion for drawing the tape, and the guide wall for running the tape which is installed at the front face portion of the casing, and which is composed of the guide face portion extended from lower casing by the width of the tape, and the support portion vertically extended from the upper casing at the rear side of the guide face portion. The vertical first ribs are provided on one of the opposing faces of the guide face portion and the support portion and the second ribs which are fitted to the first rib, are protrudingly provided on the other one of the opposing faces. Accordingly, even when the thickness of the casing is reduced, the reinforcing ribs on the guide wall for running the tape do not reach the side face of the casing. Therefore, there is no shift in the longitudinal direction in the cassette. Especially, the shift in the longitudinal direction in the cassette can be prevented even after long hours of usage of the tape cassette or against an environmental change, or even when there is a warp deformation, or even when stresses from an upward or downward direction are applied thereon. The cassette can safely be maintained and employed. There is no failure in integration operation. The cassette is strong against an impact force, and the durability is enhanced. There is no disadvantage in running the tape. The strength of the casing can be increased by the reinforcing ribs which are made as small as possible. The invention can provide a tape cassette having a simplified reinforcing portion, no recess-in-molding in the appearance of the case, a good outlook and high reliability.

According to the fourth aspect of the present invention, the bonding boss which is installed proximate to the light source cylinder forming the light source hole of the upper casing, is connected to the light source cylinder by a plurality of reinforcing ribs. Therefore, even when the thickness of the casing is reduced, the casing is strong against stresses in the longitudinal direction of the casing or by torsion, and no shift is caused at the bonding portion by dropping the tape cassette or the like. There is no occurrence of cracks or a failure in appearance by white turbidity at the root portion of the boss. The strength of the casing can be increased by the reinforcing ribs which are made as small as possible. A tape cassette can be provided having a simplified reinforcing portion, no recess in molding in the appearance of the case, a good outlook and a high reliability.

As stated above, the invented tape cassettes solve the various problems accompanied by the thickness-reducing and the weight-reducing, promote the production efficiency, lower the production cost and stabilize the quality.

We claim:

1. A tape cassette comprising:

a cassette casing composed of an upper casing and a lower casing;

a pair of tape reels rotatably installed in the cassette casing and wound with a tape;

a guide pin for controlling a running position of the tape; and a rotatable opening and closing lid for covering an opening portion of the cassette casing for drawing out the tape;

at least one protrusion is provided on a bottom face of a recess for insertion of the guide pin provided on an inner face of the upper casing, said at least one protrusion controlling a height of the guide pin.

2. A tape cassette comprising:

a casing composed of an upper casing and a lower casing and accommodated with a wound tape;

a claw provided at one end of the lower casing which permits an erasure; and at least one rib for restraining a warp of the claw toward an inside of the casing, said at least one rib being protrudingly provided at a root of the claw so as to extend toward an inside of said casing from a surface of said claw which faces the inside of said casing, said at least one rib being formed on an inner bottom face of the lower casing.

3. The tape cassette according to claim 2, in which the at least one rib comprises two ribs and the two ribs are extended in parallel with a direction of the warp of the claw along the inner bottom face of the lower casing, and are provided at both sides of the root of the claw.

4. A tape cassette comprising:

a cassette casing composed of an upper casing and a lower casing;

a pair of tape reels rotatably provided in the cassette casing and wound with a tape;

an opening and closing lid for covering an opening portion of the cassette casing for drawing out the tape;

a guide face portion extended from the lower casing by a width of the tape; and a support portion extended vertically from the upper casing at a rear side of the guide face portion;

a tape running guide wall is provided at a front face portion of the cassette casing which comprises the guide face portion extended from the lower casing by a width of the tape and the support portion extended vertically from the upper casing at a rear side of the guide face portion, and vertical linear first ribs are protruded from a rear face of the guide face portion which faces an inside of said cassette casing, said first ribs being parallel to each other, whereas vertical linear second ribs are protruded from said support portion, said second ribs being parallel to said support portion and being longitudinally offset with respect to said first ribs to permit said first and second ribs to be slidably fitted to each other.

5. The tape cassette according to claim 4, wherein said second ribs are shorter in length than said first ribs.

6. A tape cassette comprising:

a cassette casing composed of an upper casing and a lower casing;

a pair of tape reels rotatably provided in the cassette casing and wound with a tape;

an opening and closing lid for covering an opening portion of the cassette casing for drawing out the tape; and a tape running guide wall provided at a front face portion of the cassette casing further comprising:

a guide face portion extended from the lower casing by a width of the tape; and a support portion extended vertically from the upper casing at a rear side of the guide face portion;

a partition wall surrounds a detection hole formed on the upper casing and a first rib protrudingly installed apart from the partition wall is provided on the upper casing in parallel with the support portion and a pair of second ribs respectively fitted to the detection hole and the first rib are opposingly provided on a side of a rear face of the guide face portion of the lower casing.

7. A tape cassette comprising:

a casing composed of an upper casing and a lower casing integrated by a bonding boss;

a pair of tape reels rotatably installed in the casing and wound with a tape; and a rotatably opening and closing lid for covering an opening portion of the casing for drawing out the tape;

the bonding boss is installed proximate to a light source cylinder which forms a light source hole of the upper casing, and the bonding boss is connected to the light source cylinder by a plurality of spaced reinforcing ribs, a pair of the reinforcing ribs being connected to both the bonding boss and the light source cylinder in tangential directions of the bonding boss and the light source cylinder, the bonding boss having a cylindrical shape.

* * * * *